United States Patent [19]

Kurosawa et al.

[11] 4,344,143

[45] Aug. 10, 1982

[54] DIGITAL TYPE DISTANCE RELAY SYSTEM

[75] Inventors: Yasuhiro Kurosawa, Hino; Tetsuo Matsushima, Fuchu, both of Japan

[73] Assignee: Tokyo Shibaura Denki Kabushiki Kaisha, Kawasaki, Japan

[21] Appl. No.: 134,075

[22] Filed: Mar. 26, 1980

[30] Foreign Application Priority Data

Mar. 27, 1979 [JP] Japan .................................. 54-36130

[51] Int. Cl.³ .......................... G06F 15/20; H02H 3/26
[52] U.S. Cl. ...................................... 364/492; 361/80; 324/52
[58] Field of Search ....................... 364/492, 483, 200; 361/80, 68, 79, 82; 324/51, 52

[56] References Cited

U.S. PATENT DOCUMENTS

| | | | |
|---|---|---|---|
| 3,599,044 | 8/1971 | Takemura et al. | 361/80 X |
| 3,885,199 | 5/1975 | Nohara et al. | 361/86 X |
| 3,931,502 | 1/1976 | Kohlas | 361/80 X |
| 4,107,778 | 8/1978 | Nii et al. | 364/483 X |
| 4,183,072 | 1/1980 | Takagi et al. | 364/482 X |
| 4,219,860 | 8/1980 | DePuy | 364/483 X |
| 4,228,476 | 10/1980 | Okita et al. | 364/483 X |

FOREIGN PATENT DOCUMENTS

50-119253 9/1975 Japan .

*Primary Examiner*—Edward J. Wise

*Attorney, Agent, or Firm*—Oblon, Fisher, Spivak, McClelland & Maier

[57] ABSTRACT

A digital type distance relay system comprises a sampling and hold circuit for sampling and holding the current in and voltage on a power transmission system, an A/D converter for receiving the outputs of the sampling and hold circuit through a multiplexer and converting the received analog quantities into corresponding digital quantities I and V, and a digital computer. The digital computer includes a data memory for memorizing the current I and voltage V and also a digital voltage $V_p$ having a predetermined relation to the voltage V, a setting memory for memorizing a setting value $Z_0$ for setting a range of protection of the power transmission system, a ROM for memorizing a program for executing an arithmetic operation according to the formula $|I \cdot Z_0 + K_1 V_p| - |I \cdot Z_0 - V - K_2 V_p| \geq K_0$ as well as the constants $K_1$ and $K_2$ and minimum sensitivity value $K_0$, and a CPU. The CPU executes the program dealing with the afore-mentioned arithmetic operation formula and produces a command signal for taking an action of protecting the power transmission system if the arithmetic operation formula is satisfied while producing a command signal for taking no protective action if the formula is not satisfied. The protective action can be provided even in case when the voltage V in the arithmetic operation formula is zero in level.

12 Claims, 18 Drawing Figures

DIGITAL TYPE DISTANCE RELAY SYSTEM

This invention relates to a distance relay system coupled to a power transmission system and, more particularly, to a digital type distance relay system, which can reliably determine whether or not to protect the power transmission system at the time of occurrence of a fault in the power system.

Figure 1:
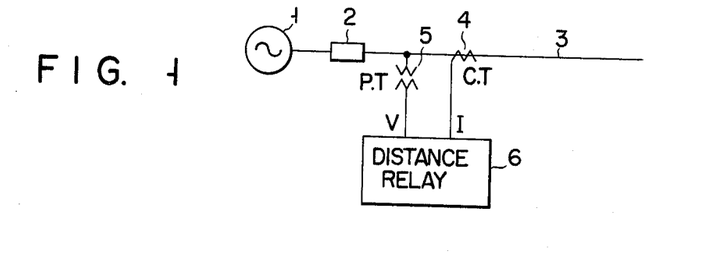
FIG. 1 is a view showing the usual connecting relation between a distance relay and a power transmission system.
Figure 2:
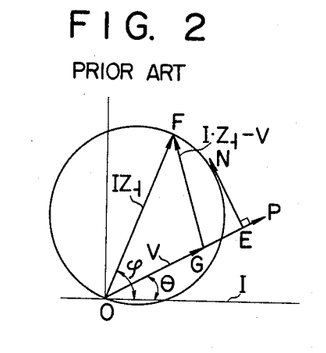
FIG. 2 is a vector diagram for illustrating the operational principles of an example of the prior-art distance relay.
Figure 3:
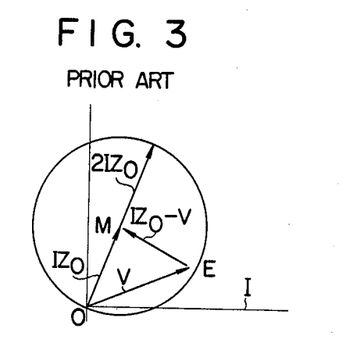
FIG. 3 is a vector diagram for illustrating the operational principles of another example of the prior-art distance relay.

Usually, as the distance relay for detecting the distance of the point of occurrence of a fault from the point of installation of the relay and also the direction of the fault point viewed from the relay installation point, those having mho characteristics or mho distance relays are extensively used. FIG. 1 shows an example of the coupling of such a mho distance relay to a power transmission system. A power source 1 is connected through a back impedance 2 to the transmission line 3. A current transformer (CT) 4 and a voltage transformer (PT) 5, respectively detecting the current in and voltage on the transmission line 3, are coupled to 20 the line 3. The output current I from the CT and the output voltage V from the PT are coupled to a mho distance relay 6. The distance relay 6 measures the distance of a point of occurrence of a fault on the transmission line 3 from it under predetermined operational principles, and determines whether or not the fault point is in a predetermined direction from it and also whether or not the fault point is within a predetermined distance from it. The operational principles of the mho distance relay are shown in FIG. 2. The operational principles are based upon a relation $$V_{PL} \otimes (I \cdot Z_1 - V) = |I \cdot Z_1| \times |V_{PL}| \cdot \cos(\phi - \theta - \Delta\theta) - \quad (1)$$

$$|V_{PL}| \cdot |V_1| \cos(\Delta\theta) \geq K_1$$

where I and V are respectively the current in and voltage on the power transmission line, $V_{PL}$ is a polarity voltage, $K_1$ a constant for determining the minimum sensitivity of the relay, $\phi$ the maximum sensitivity angle corresponding to the maximum sensitivity of the relay, $\theta$ the leading phase angle of the voltage V with respect to the current I, and $Z_1$ a setting value for setting the range of protection of the power transmission line 3 by the relay. The symbol $\otimes$ represents the inner product of vectors $V_{PL}$ and $(I \cdot Z_1 - V)$. $\Delta\theta$ represents the phase difference between the voltage V and polarity voltage $V_{PL}$. In FIG. 2, a vector $\overrightarrow{OP}$ represents the polarity voltage $V_{PL}$. Whether or not the voltage V represented by a vector $\overrightarrow{OG}$ is within a predetermined range is determined for detecting a fault point by determining whether a voltage vector $\overrightarrow{EN}$ leading the polarity voltage $V_{PL}$ in phase by 90 degrees is leading or lagging with respect to a vector $\overrightarrow{GF}$ (i.e., vector $I \cdot Z_1 - V$).

Where the afore-mentioned determination is made by a digital computer included in the relay 6, multiplication is involved in the relevant operation as is obvious from formula (1). Generally, multiplication takes several ten times the period of simple addition or subtraction when performed by a digital computer. This is undesired from the standpoint of the requirement for the distance relay to make quick determination. In order to improve this arithmetic operation, that is, to obtain a mho relay, the function of which is fulfilled only by addition and subtraction, there have been proposed the following operational principles for the relay.

$$||I \cdot Z_0| - |I \cdot Z_0 - V|| \geq K_0 \quad (2)$$

where I and V are respectively the current in and voltage on the power transmission line, $Z_0$ is a setting value for giving an operational range of the relay, and $K_0$ is a constant giving the minimum sensitivity of the relay. FIG. 3 shows a vector diagram representing the relation of formula (2) and illustrates the operational principles of the relay. In FIG. 3, whether or not to actuate the relay is determined depending upon whether the magnitude of a vector $\overrightarrow{EM}$, that is, $|I \cdot Z_0 - V|$, is greater or less than the magnitude of a vector $\overrightarrow{OM}$, that is, $|I \cdot Z_0|$. A mho relay which is constructed under such operational principles permits ready digital processing in the digital computer. With such a mho relay, however, in case of occurrence of a fault in the power transmission system in the vicinity of the point of installation of the relay the afore-mentioned voltage V is reduced to zero in level, that is, the left side of equation (2) is reduced to $||I \cdot Z_0| - |I \cdot Z_0 - |\,| = 0$. In other words, the left side of equation (2) becomes less than the minimum sensitivity constant $K_0$, so that the mho relay can no longer determine the direction of the fault point from it, that is, can no longer determine whether or not to take a protective action. From the above grounds, there has been demanded a distance relay, with which even when the voltage V is reduced to zero level due to occurrence of a fault in the power transmission system in the vicinity of the point of installation of the relay the fault can be reliably and accurately responded without the possibility of erroneously determining the direction of the fault point from the relay.

An object of the invention, accordingly, is to provide a digital type distance relay system, with which even when the input voltage to it is reduced to zero level due to occurrence of a fault in the power transmission line in the vicinity of the point of its installation the fault can be reliably and accurately responded without the possibility of erroneously determining the direction of the fault point from it.

The digital type distance relay system according to the invention comprises a sampling and hold circuit for sampling and holding the current in and voltage on a power transmission system, an analog-to-digital (A/D) converter for receiving the outputs of the sampling and hold circuit through a multiplexer and converting the received analog quantities into corresponding digital quantities I and V, and a digital computer for arithmetically processing the outputs of the A/D converter on the basis of a predetermined arithmetic operation formula and producing a determination output as to whether or not to take an action of protecting the power transmission system in accordance with the result of the arithmetic processing. The digital computer includes a data memory for memorizing the digital current I, digital voltage V and also a digital voltage $V_P$ having a predetermined relation to the digital voltage V, a protection range setting memory for memorizing a setting value $Z_0$ for setting a range of protection of the power transmission system by the digital type protection relay system, a program memory for memorizing constant values $K_1$ and $K_2$, minimum sensitivity value $K_0$ of the relay system and a program for executing an arithmetic operation on a formula represented by $$|I \cdot Z_0 + K_1 V_P| - |I \cdot Z_0 - V - K_2 V_P| \geq K_0 \quad \{\text{where}$$
$|I \cdot Z_0 + K_1 V_P|$, $|I Z_0 - V - K_2 V_P|$ are AC amplitudes of AC quantities $(I \cdot Z_0 + K_1 V_P)$, $(I Z_0 - V - K_2 V_P)$ and are calculated from the digital current I, digital voltages V, $V_P$, constant values $K_1$, $K_2$ and setting value $Z_0$.}, an input/output interface, and a central processing unit (CPU) coupled to the data memory, protection range setting memory, program memory and input/output interface and serving to execute the program dealing with the arithmetic operation formula and produce an output commanding an action of protecting the power transmission system if the formula is satisfied and an output commanding no protective action if the formula is not satisfied.

This invention can be more fully understood from the following detailed description when taken in conjunction with the accompanying drawings, in which.

The operational principles of the distance relay system according to the invention are represented as $$|I \cdot Z_0 + K_1 \cdot V_P| - |I \cdot Z_0 - V - K_2 \cdot V_P| \geq K_0 \quad (3)$$

Where I and V are respectively digital values of the current in and voltage on the power transmission system, $Z_0$ is a protection range setting value for setting the range of protection of the power transmission system by the distance relay system (hereinafter referred to merely as setting value), $K_0$ is a constant representing the minimum sensitivity value of the distance relay system, and $K_1$ and $K_2$ are respective constants. $V_P$ represents a digital value of a voltage which is different both in magnitude and phase from the voltage V and has a predetermined relation thereto. For example, $V_P$ and V are voltages on the same power system and related to each other as $$V_P = k_0 \cdot V \angle \psi \quad (4)$$

where $k_0$ is a constant, and $\psi$ represents the leading phase angle of the voltage $V_P$ with respect to the voltage V. Substitution of equation (4) into formula (3) yields $$|I \cdot Z_0 + K_1 \cdot k_0 \cdot V \angle \psi| - |I \cdot Z_0 - (1 + K_2 \cdot k_0 \angle \psi) \cdot V| \geq K_0 \quad (5)$$

Multiplying formula (5) by $1/|k_1 \angle \psi|$ and transforming the result, we obtain $$\left| \frac{I \cdot Z_0}{k_1 \angle \psi} + V \right| - \frac{|1 + k_2 \angle \psi|}{|k_1 \angle \psi|} \cdot \quad (6)$$

$$\left| \frac{I \cdot Z_0}{1 + k_2 \angle \psi} - V \right| \geq K_0 \cdot \frac{1}{|k_1 \angle \psi|}$$

where $k_1 = k_0 \cdot K_1$ and $k_2 = k_0 \cdot K_2$.

Substituting $$I \cdot Z_0 / k_1 \angle \psi = \dot{a}, \quad (7)$$

$$I \cdot Z_0 / (1 + k_2 \angle \psi) = \dot{b}$$

and $\quad |1 + k_2 \angle \psi| / |k_1 \angle \psi| = c$ into formula (6) we obtain $$|\dot{a} + V| - c \cdot |\dot{b} - V| \geq K_0 \cdot \frac{1}{|k_1 \angle \psi|} \quad (8)$$

In formula (8), the value of the right side of the equation is actually very small, and by ignoring it for this reason and also for the purpose of facilitating the vector analysis we obtain $$|\dot{a} + V| \geq c \cdot |\dot{b} - V| \quad (9)$$

Figure 4:
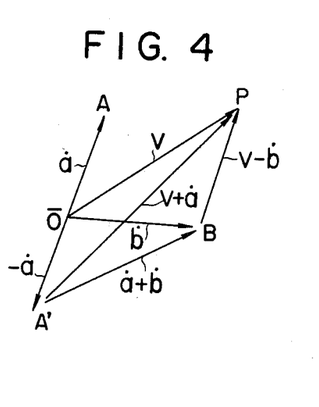
FIGS. 4, 5, 6, 13 and 14 are vector diagrams for illustrating the operational principles and effects of the system according to the invention.

This vector relation of formula (9) is shown in FIG. 4.

Figure 5:
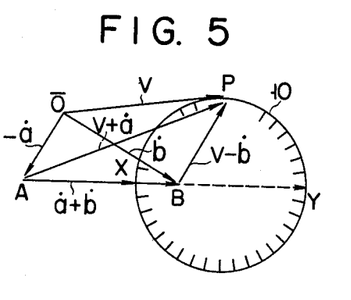

In FIG. 4, a vector $\overrightarrow{A'B} = (\dot{a} + \dot{b})$ connecting the terminal point of a vector $\overrightarrow{OA'}(= -\dot{a})$ having the opposite sense to a vector $\overrightarrow{OA}(=\dot{a})$ and the terminal point of a vector $\overrightarrow{OB}(=\dot{b})$ is taken as a basic vector. In $\triangle A'BP$ with the base thereof constituted by the vector $\overrightarrow{A'B}$, denoting the ratio of the magnitude of a vector $\overrightarrow{A'P}(= -V + \dot{a})$ and that of a vector $\overrightarrow{BP}(= V - \dot{b})$, that is, the ratio between the sides $\overrightarrow{A'P}$ and $\overrightarrow{BP}$, by C:1, a vector terminal point P draws a circle 10 as shown in FIG. 5, with the diameter thereof being a line-segment $\overline{XY}$ connecting a point X, with which the ratio of the side $\overline{AB}$ to a segment $\overline{AX}$ is C:1, and a point Y, with which the ratio of a segment $\overline{AY}$ to the side $\overline{AB}$ is C:1. Thus, the range that satisfies relation (9) is within this circle.

In FIG. 5, the vectors $\overrightarrow{OX}$ and $\overrightarrow{OY}$ are given as $$\overrightarrow{OX} = -\dot{a} + \frac{c}{1+c}(\dot{a} + \dot{b}) \quad (10)$$

and $$\overrightarrow{OY} = -\dot{a} + \frac{c}{1-c}(\dot{a} + \dot{b})$$

Figure 6:
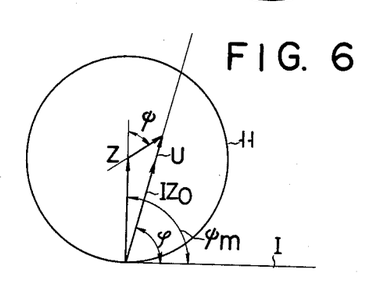

Also, in connection with FIGS. 5 and 6, the vector $\overrightarrow{OZ}$ connecting the center Z of the circle 10 and point $\overline{O}$ and the radius $|XY/2|$ of the circle 10 and respectively expressed as $$\overrightarrow{OZ} = \overrightarrow{OX} + \frac{\overrightarrow{OY} - \overrightarrow{OX}}{2} = \frac{1}{c^2 - 1}\dot{a} + \frac{c^2}{c^2 - 1}\dot{b} = \quad (11)$$

$$\frac{1 + (k_1 + k_2)\angle -\psi}{|1 + k_2 \angle \psi|^2 - k_1^2} \cdot I \cdot Z_0 \text{ and } \frac{\overrightarrow{YX}}{2} =$$

$$\left|\frac{c}{c^2 - 1}\right| \cdot |\dot{a} + \dot{b}| = \frac{|1 + (k_1 + k_2)\angle -\psi|}{|1 + k_2 \angle \psi|^2 - k_1^2} |I \cdot Z_0|$$

Further, since the ratio of the magnitudes of the vectors $\dot{a}$ and $\dot{b}$ is C:1, it is obvious that the point $\overline{O}$ lies on a circle 11 other than the circle 10. FIG. 6 shows vector relations representing equations (11). In FIG. 6, $\psi$ represents the leading angle of the vector $I \cdot Z_0$ with respect to the current I. The vector $\overrightarrow{OU}$ is expressed as $$\overrightarrow{OU} = \frac{1}{|1 + k_2 \angle \psi| - k_1^2} \cdot I \cdot Z_0$$

where $\psi$ represents the angle between the vectors $\overrightarrow{OZ}$ and $\overrightarrow{ZU}$. The ratio of the magnitudes of the vectors $\overrightarrow{OZ}$ and $\overrightarrow{ZU}$ is $1:(k_1+k_2)$. Thus, the maximum sensitivity angle $\psi_m$ is expressed as $$\psi_m = \psi + \tan^{-1}\left(\frac{(k_1 + k_2)\sin\psi}{1 + (k_1 + k_2)\cos\psi}\right) \quad (12)$$

The operational principles of the system according to the invention are as mentioned above.

Figure 7:
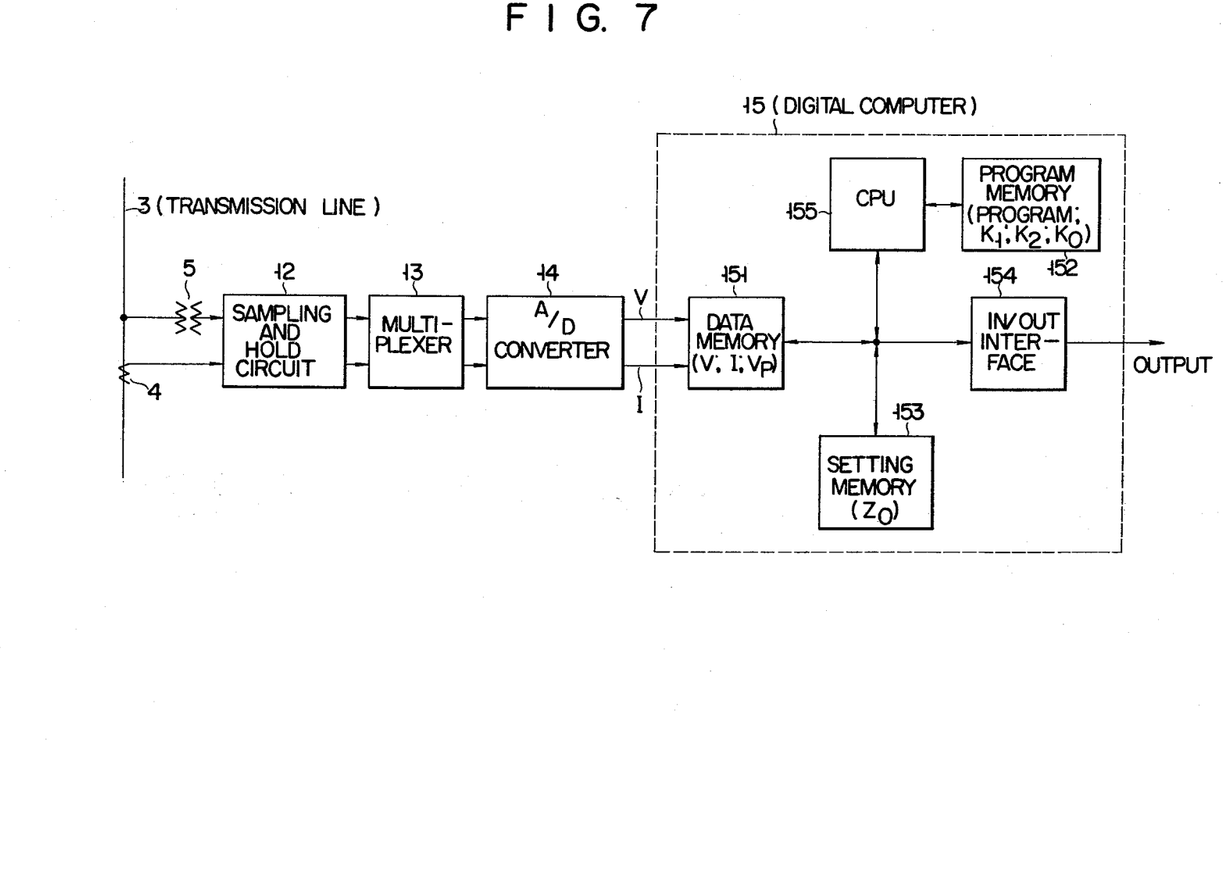
FIG. 7 is a block diagram showing the construction of the relay system embodying the invention.

Now, an embodiment of the system according to the invention will be described with reference to FIG. 7. The current in and voltage on a power transmission line 3 at a point of installation of the relay system according to the invention are respectively detected by a current transformer 4 and a voltage transformer 5, and the outputs of these transformers are coupled to a sampling and hold circuit 12. The current and voltage inputs to the sampling and hold circuit 12 are successively switched by a multiplexer 13 and coupled to an analog-to-digital (A/D) converter 14, which produces a digital current I corresponding to the input current to the sampling and hold circuit and a digital voltage V corresponding to the input voltage. These digital voltages are coupled to a digital computer 15, which includes a data memory 151, a program memory 152, a setting memory 153 for setting $Z_0$, an input/output (IN/OUT) interface 154 and a central processor unit (CPU) 155 connected to the data memory 151, program memory 152, setting memory 153 and IN/OUT interface 154. In the data memory 151, the outputs V and I of the A/D converter 14 are written, and also a digital voltage $V_P$ having a predetermined relation to the voltage V, for instance having a relation $V_P = k_0 \cdot V \angle \psi$ (see equation (4)), is written. The program memory 152 is a read-only memory (ROM), in which a program for executing the operation on equation (3) as well as the constants $K_1$ and $K_2$ and minimum sensitivity constant $K_0$ are previously stored. In the setting memory 153, the setting value $Z_0$ for setting the range of protection of the power transmission line by the distance relay system is memorized. The CPU 155 reads in necessary data from the data memory 151, program memory 152 and setting memory 153 to execute arithmetic operation on equation (3) according to the program stored in the program memory 152 and produces an output command for effecting an action of protecting the power system in case if the relation of formula (3) is satisfied and produces an output command for effecting no protective action if the relation is not satisfied.

Figure 8:
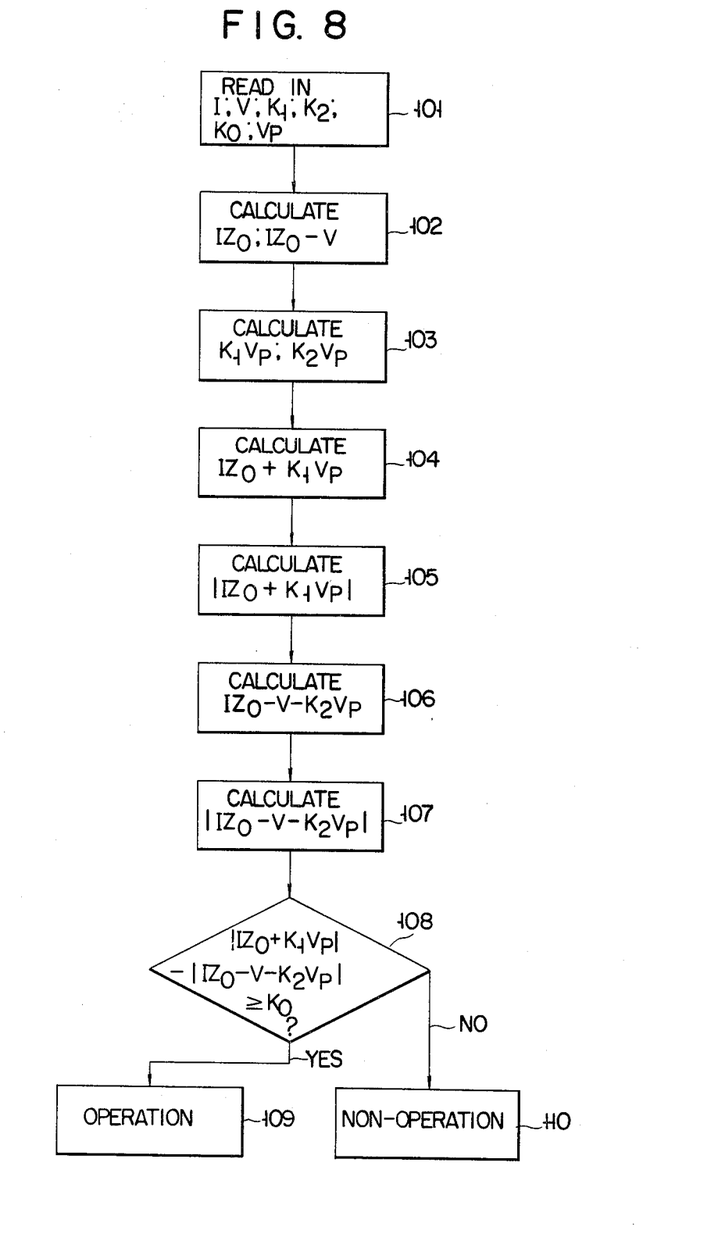
FIG. 8 is a flow chart showing a first example of the operation executed by a CPU in the system of FIG. 7.

The operation of the CPU 155 will now be described step by step with reference to FIG. 8. In a first step 101, the CPU 155 reads in I, V, and $V_P$ from the data memory 151 (I, V, $V_P$ are sampled values of current, voltage and predetermined voltage with relation to equation (3)), the constants $K_1$ and $K_2$ and minimum sensitivity constant $K_0$ from the program memory 152 and the setting value $Z_0$ from the setting memory 153. In a second step 102, it calculates the AC quantities $I \cdot Z_0$ and $I \cdot Z_0 - V$. In a third step 103, it calculates the AC quantities $K_1 V_P$ and $K_2 V_P$. In a fourth step 104, it calculates the AC quantity $I \cdot Z_0 + K_1 V_P$. In a fifth step 105, it calculates the amplitude $|I \cdot Z_0 + K_1 V_P|$ of that AC quantity from the equation (1) or (4) disclosed in U.S. Pat. No. 4,073,008 incorporated by reference herein. In a sixth step 106, it calculates the AC quantity $I \cdot Z_0 - V - K_2 V_P$. In a seventh step 107, it calculates the amplitude $|I \cdot Z_0 - V - K_2 V_P|$ of that AC quantity from the equation (1) or (4) disclosed in U.S. Pat. No. 4,073,008. In an eighth step 108, it provides a command output (YES) for taking a protective action to the interface 154 if the relation $|I \cdot Z_0 + K_1 V_P| - |I \cdot Z_0 - V - K_2 V_P| \geq K_0$ is satisfied while providing a command output (NO) for taking no action if the relation is not satisfied.

As has been shown, with the distance relay system according to the invention the voltage $V_P$ which is related to the voltage V as $V_P = k_0 \cdot V \angle \psi$ is written in the data memory 151, and whether the relation $|I \cdot Z_0 + K_1 V_P| - |I \cdot Z_0 - V - K_2 V_P| \geq K_0$ is satisfied or not is determined in the CPU 155, so that the determination can be made even in case when the voltage V is reduced to zero level due to the occurrence of a fault in the power system at a point in the vicinity of the point of installation of the relay system. Thus, even in such a case it is possible to reliably and accurately respond to the fault without the possibility of erroneously determining the direction of the point of occurrence of the fault.

Now, another embodiment of the invention will be described. The operational principles of this embodiment are based upon a relation $$|I \cdot Z_0 + K_1 V_P| - |I \cdot Z_0 - K_2 V_P| \geq K_0 \quad (13)$$

where I, $Z_0$, V, $V_P$, $K_1$, $K_2$ and $K_3$ are the same as in formula (3) so their description is omitted here. Taking $$\dot{a} = \frac{I \cdot Z_0}{k_1 \angle \psi}, \quad \dot{b} = \frac{I \cdot Z_0}{k_2 \angle \psi} \text{ and } c = \frac{k_2}{k_1}$$

and also assuming $k_1=k_2$, the relation of formula (13) reduces to $$|\vec{a}+\vec{V}|-|\vec{a}-\vec{V}|\geq K_0 \qquad (13a)$$

Assuming $k_1 \neq k_2$, the relation of formula (13) is expressed as $$|\vec{a}+\vec{V}|-c\cdot|\vec{b}-\vec{V}|\geq K_0 \qquad (13b)$$

Figure 9:
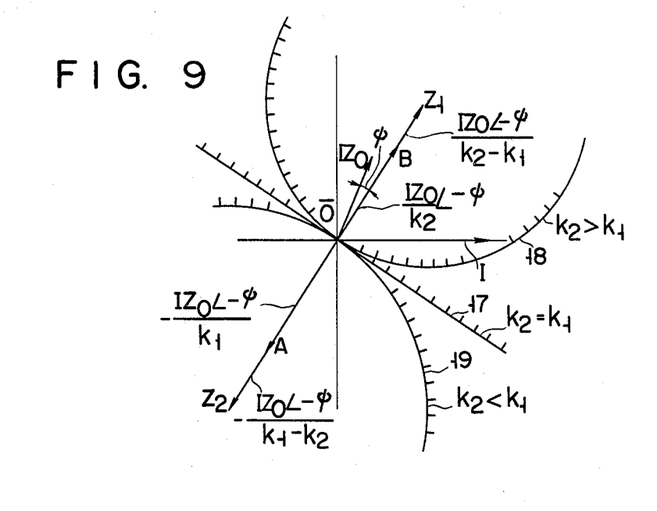
FIG. 9 is a vector diagram showing a first example of the characteristic of the system according to the invention.

FIG. 9 show the relations of formulae (13a) and (13b). In FIG. 9, a vector $\overrightarrow{OB}(=\vec{b})$ is lagging behind a vector $I\cdot Z_0$ by $\psi$. A vector $\overrightarrow{OA}(=-\vec{a})$ has a direction different from the vector $\overrightarrow{OB}$ by 180 degrees. With $k_1=k_2$, a portion over an inclined line 17 passing through the origin $\overline{O}$ constitutes the operating region of the relay system as is obvious from equation (13a). With $k_1 \neq k_2$, the operating region of the relay system has a circular characteristic, that is, it is represented by a circle 18 or 19. Also, the vectors $\overrightarrow{OZ_1}$ and $\overrightarrow{OZ_2}$ each connecting the origin $\overline{O}$ and the center of each of the circles 18 and 19 and the radius $|YX/2|$ thereof (Y and X being not shown but see FIG. 5) are expressed as $$\overrightarrow{OZ_1} = \overrightarrow{OZ_2} = \frac{I\cdot Z_0}{k_2-k_1}\angle -\psi$$

and $$\left|\frac{\overrightarrow{YX}}{2}\right| = \frac{|I\cdot Z_0|}{|k_2-k_1|}$$

In case when $k_1 < k_2$, the operating region of the relay system is within the circle 18, while in case when $k_1 > k_2$ it is within the circle 19.

Figure 10:
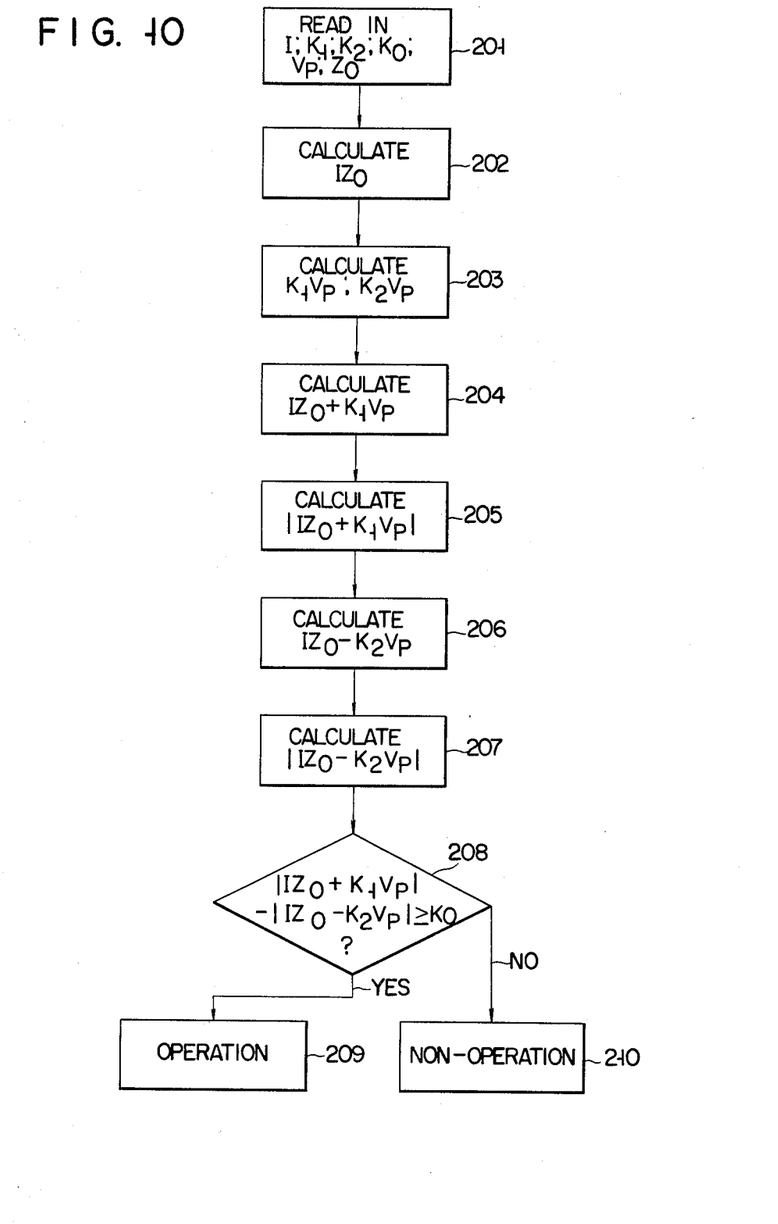
FIG. 10 is a flow chart showing a second example of the operation executed by the CPU in the system of FIG. 7.

FIG. 10 shows a flow chart of a program executed by the CPU 155 in another embodiment of the invention based upon the principles represented by relation 13. This embodiment is different from the preceding embodiment, which is based upon the operational principles given by the relation of formula (13), by the fact that the program which is previously written in the program memory of this embodiment is one for executing the operation on the relation of formula (13). Similar to the previous embodiment which is based upon the principles of the relation of formula (3), the current I and voltages V and $V_P$ are sampled values and are written in the data memory, the constants $K_1$, $K_2$ and $K_3$ are written in the program memory 152, and the protection range setting value $Z_0$ is written in the setting memory 153. The program executed by the CPU 155 in this case will now be described with reference to FIG. 10. In a first step 201, the CPU 155 reads in the current I and voltage $V_P$ from the data memory 151, the constants $K_1$ and $K_2$ and minimum sensitivity constant $K_0$ from the program memory 152 and the setting value $Z_0$ from the setting memory 153. In a second step 202, it calculates the AC quantity $I\cdot Z_0$. In a third step 203, it calculates the AC quantities $K_1 V_P$ and $K_2 V_P$. In a fourth step 204, it calculates the AC quantity $I\cdot Z_0 + K_1 V_P$. In a fifth step 205, it calculates the amplitude $|I\cdot Z_0+K_1 V_P|$ of the AC quantity from the equation (1) or (4) disclosed in U.S. Pat. No. 4,073,008. In a sixth step 206, it calculates the AC quantity $I\cdot Z_0 - K_2 V_P$, and in a seventh step 206 is calculates the amplitude $|I\cdot Z_0 - K_2 V_P|$ of that AC quantity from the equation (1) or (4) disclosed in U.S. Pat. No. 4,073,008 incorporated by reference herein. In an eighth step 208, it calculates the difference between the AC quantity amplitude values, namely $|I\cdot Z_0+K_1 V_P| - |I\cdot Z_0-K_2 V_P|$, and compares the result with $K_0$. If the relation of formula (13) is satisfied, the CPU 155 sends out a command output for taking an action of protection of the power transmission system to the IN/OUT interface 154, while producing a command output for taking no protective action if the relation is not satisfied. Since with this embodiment the voltage $V_P$ related to the voltage V as $V_P=k_0\cdot V\angle \psi$ is written in the data memory 151 and whether the relation $|I\cdot Z_0+K_1 V_P| - |I\cdot Z_0-K_2 V_P| \geq K_0$ is satisfied or not is determined in the CPU 155, the determination can be made in case when the voltage V is reduced to zero level due to the occurrence of a fault in the power system at a point in the vicinity of the point of installation of the relay system. Thus, even in such a case measures against the fault can be reliably taken without the possibility of erroneously determining the direction of the point of occurrence of the fault.

FIRST MODIFICATION OF $V_P$

Figure 11:
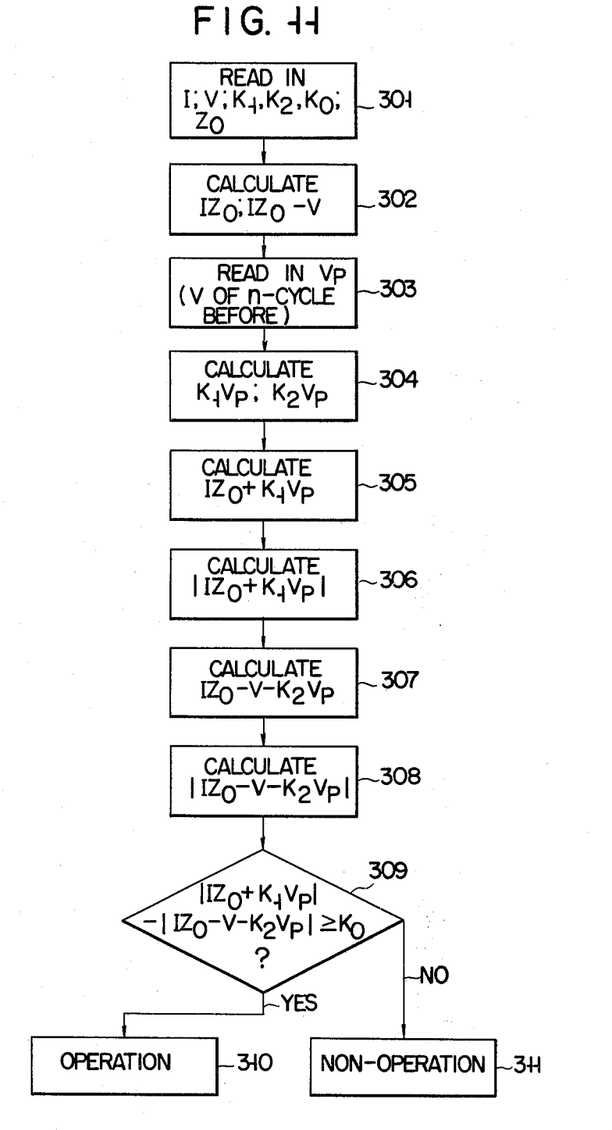
FIG. 11 is a flow chart showing a third example of the operation executed by the CPU in the system of FIG. 7.

While in the above embodiments (see FIGS. 8 and 10) the voltage $V_P$ related to the voltage as $V_P=k_0\cdot V\angle \psi$ is written into the data memory 151, it is also possible to write a voltage $V_N$ n cycles before the voltage V or a voltage $-V_W$ $(n-\frac{1}{2})$ cycles before the voltage V as voltage $V_P$ in the data memory. In this case, n is a positive integer greater than 1. In this case, the operation of the CPU 155 in the relay system according to the invention based upon the operational principles given by the relation of formula (3) is as shown in the flow chart of FIG. 11. In a first step 301 of this operation, the CPU 155 reads in the sampled valves I, V of current and voltage voltage from the data memory 151, the constants $K_1$, $K_2$ and $K_0$ from the program memory 152 and the setting value $Z_0$ from the setting memory 153. In a second step 302, it calculates $I\cdot Z_0$ and $I\cdot Z_0-V$. In a third step 303, it reads in the sampled voltage $V_P$ n cycles before the voltage V from the data memory 151. In a fourth step 304, it calculates the AC quantities $K_1 V_P$ and $K_2 V_P$. In a fifth step 305, it calculates the AC quantities $I\cdot Z_0+K_1 V_P$, and in a sixth step 306 it calculates the amplitude $|I\cdot Z_0+K_1 V_P|$ of the AC quantity from the equation (1) or (4) disclosed in U.S. Pat. No. 4,073,008. In a seventh step 307 is calculates the AC quantity $I\cdot Z_0-V-K_2 V_P$, and in an eighth step 308 it calculates the AC amplitude value $|I\cdot Z_0-V-K_2 V_P|$ from the result of calculation in the seventh step 307. In a ninth step 309, it calculates the difference between the amplitude values, namely $|I\cdot Z_0+K_1 V_P| - |I\cdot Z_0-V-K_2 V_P|$, and compares the result with $K_0$. If the relation of formula (3) is satisfied, it sends out a command for taking an action of protecting the power system to the IN/OUT interface 154, while producing a command for taking no protection action if the relation is not satisfied.

Figure 12:
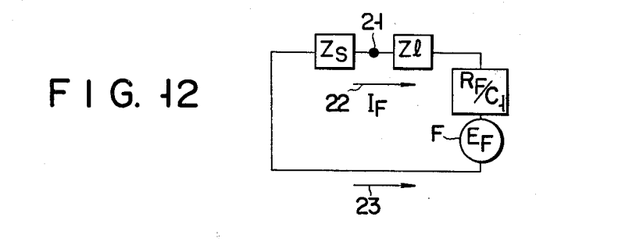
FIG. 12 is a circuit diagram showing an equivalent circuit of a three-phase power transmission line at the time of occurrence of a short-circuit fault.

The reason why the voltage n or $(n-\frac{1}{2})$ cycles before the voltage V can be used as voltage $V_P$ will now be given. When there is no fault in the power transmission system, the voltages V and $V_P$ are the same in magnitude, and it is obvious that the phase difference between the voltages V and $V_P$ is either $2n\pi$ or $(2n-1)\pi$ unless the frequency of the power system does not vary during the period of n or $(n-\frac{1}{2})$ cycles. When a fault occurs in the power transmission system, the magnitudes and phases of the voltages V and $V_P$ and the afore-mentioned phase difference vary. This will be explained by taking as an example the case of occurrence of a three-phase short-circuit fault. FIG. 12 shows an equivalent circuit of the power system at the time of occurrence of a three-phase short-circuit trouble. The voltage $E_F$ at the point F of the fault before the occurrence thereof is given as $$E_F = I_F(Z_S + Zl + R_F/C_1)$$

where $Z_S$ is the back impedance looked from the relay system installation point 21, Z is the characteristic impedance of the transmission line, l is the distance from the installation point 21 to the fault point F, $R_F$ is the resistance of the fault point F, and $C_1$ is the current ratio between the current $I_F$ and current flowing in the direction of arrow 23 into the fault point F. The voltage $V_1$ at the fault point F is expressed as $$V_1 = I_F R_F/C_1$$

The voltage V at the relay system installation point 21 is given as $$V_1 = I_F Zl + V_1$$

Thus, the relation between the voltage V at the relay system installation point 21 at the time of occurrence of the fault and the voltage $E_F$ at the fault point before the occurrence of the fault are expressed by an equation $$E_F = V + I_F Z_S \qquad (14)$$

Figure 13:
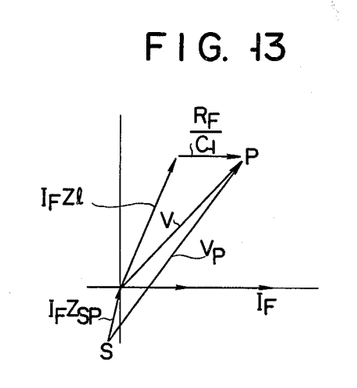
Figure 14:
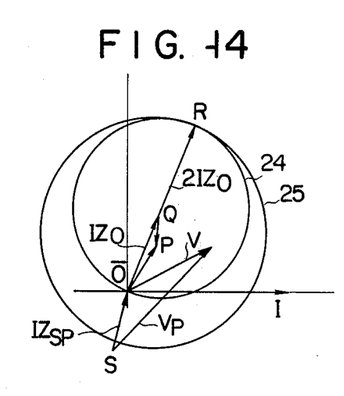

It will be apparent from equation 14 that the voltage $E_F$ at the fault point before the occurrence of the fault appears as the afore-mentioned voltage V at the relay system installation point 21 during the period of n or $(n-\frac{1}{2})$ cycles from the occurrence of the fault. FIG. 13 shows a vector diagram representing the relation among $I_F$, V, $I_F Z_S$, $I_F Z$, $R_F/C_1$ and $V_P$. FIG. 14 shows a vector diagram in case when $E_F$ in equation 14 is used as $V_P$ in the relation of formula (3), that is, at the time of transition from the occurrence of the fault. The vector diagram of FIG. 14 is drawn by setting $K_1 = K_2 = k$ in the relation of formula (3) for the same of brevity of the description. In FIG. 14, point P is the center of a circle 25, that is, the center of the afore-mentioned transient characteristic. The radius $|PR|$ of the circle 25 is given as $$\overrightarrow{OP} = I \cdot Z_0 - \frac{k}{1+2k} I \cdot Z_{SP} \qquad (15)$$

$$\text{and} \quad |\overrightarrow{PR}| = |I \cdot Z_0| \left(1 + \frac{k}{1+2k}\right)$$

where $Z_{SP}$ is the impedance from the relay system installation point to the back power source. A circle 24 represents the characteristic before the occurrence of the fault. A vector $\overrightarrow{SO}$ represents $I \cdot Z_{SP}$, and a vector $\overrightarrow{QP}$ represents $k/1+2kI \cdot Z_{SP}$.

It will be seen that by reducing the value of k the vector QP is reduced so that the circle 25 approaches the circle 24. Thus, the value of the constant k may be suitably set by taking the influence of the fault point resistance $R_F$ and load current into considerations.

Now, the case of applying equation (14) to relation of formula (13) will be discussed. By setting $K_1 = K_2 = k$ in relation (13), we obtain $$|I \cdot Z_0 + kI \cdot Z_{SP} + kV| - |I \cdot Z_0 - kI \cdot Z_{SP} - kV| \geq K_0 \qquad (16)$$

Figure 15:
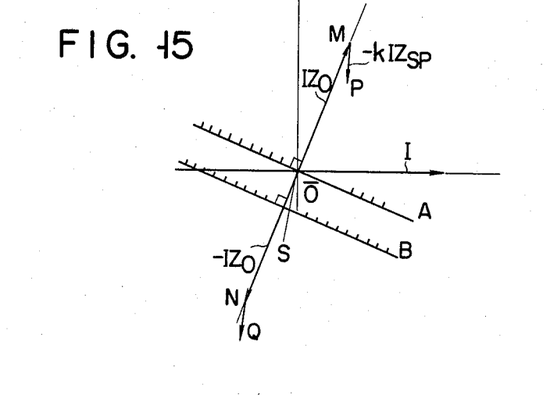
FIG. 15 is a vector diagram showing a second example of the characteristic of the system according to the invention.

FIG. 15 shows the characteristic given by the relation of formula (16). In FIG. 15, a vector $\overrightarrow{SO}$ represents $I \cdot Z_s$, a vector $\overrightarrow{OM}$ $I \cdot Z_0$, a vector $\overrightarrow{ON}(-I \cdot Z_0)$, a vector $\overrightarrow{MP}(-kI \cdot Z_{SP})$, and a vector $\overrightarrow{NQ}$ is the same as the vector $\overrightarrow{MP}$. A vector A represents the characteristic before the occurrence of the fault, and a vector B represents the transient characteristic.

SECOND MODIFICATION OF $V_P$

As the voltage $V_P$ may be used a voltage different in phase from the voltage V. Where the power system is a three-phase system including three phases R, S and T, in case of introducing the voltage from the R, S and T phases voltages $V_{P(R)}$, $V_{P(S)}$ and $V_{P(T)}$ as defined below may be used as the voltage $V_P$.

R phase: $V_{P(R)}$ is a voltage n or $(n-\frac{1}{2})$ cycles before a voltage $(V_{ST}\angle 90° + K_3 V_R)$ where $V_{ST}\angle 90°$ is a voltage leading the voltage between the S and T phases by 90°.

S phase: $V_{P(S)}$ is voltage n or $(n-\frac{1}{2})$ cycles before a voltage $(V_{TR}\angle 90° + K_3 V_S)$ where $V_{TR}\angle 90°$ is a voltage leading the voltage between the T and R phases by 90°.

T phase: $V_{P(T)}$ is a voltage n or $(n-\frac{1}{2})$ cycles before voltage $(V_{RS}\angle 90° + K_3 V_T)$ where $V_{RS}\angle 90°$ is a voltage leading the voltage between the R and S phases by 90°.

For example, by substituting $V_{P(R)}$ into formula (13) we obtain $$|I_R \cdot Z_0 + K_1 \cdot V_{P(R)}| - |I_R \cdot Z_0 - V_R - K_2 \cdot V_{P(R)}| \geq K_0 \qquad (17)$$

Similarly, in case of introducing the voltage from, for instance, R phase, substitution of $V_{P(R)}$ into formula (13) yields $$|I_R \cdot Z_0 + K_1 \cdot V_{P(R)}| - |I_R \cdot Z_0 - K_2 \cdot V_{P(R)}| \geq K_0 \qquad (18)$$

In relations (17) and (18), $I_R$ represents the current of R phase, and $V_R$ represents the voltage of R phase. In case of introducing the current $I_S$ and voltage $V_S$ of S phase or the current $I_T$ and voltage $V_T$ of T phase, $V_{P(S)}$ and $V_{P(T)}$ may be substituted for $V_{P(R)}$ in relations (17) and (18), so that details in this case are not discussed.

Figure 16:
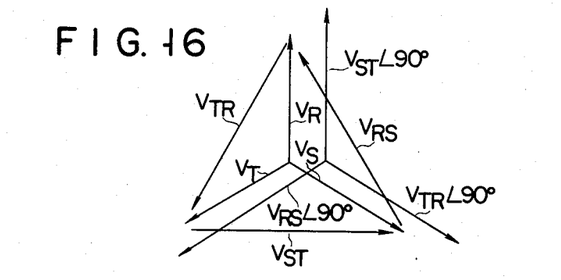
FIG. 16 is a vector diagram showing the relation between voltage vectors at the time of the normal state of the three-phase power transmission line and voltage $V_P$ which is written in the data memory shown in FIG. 7.
Figure 17:
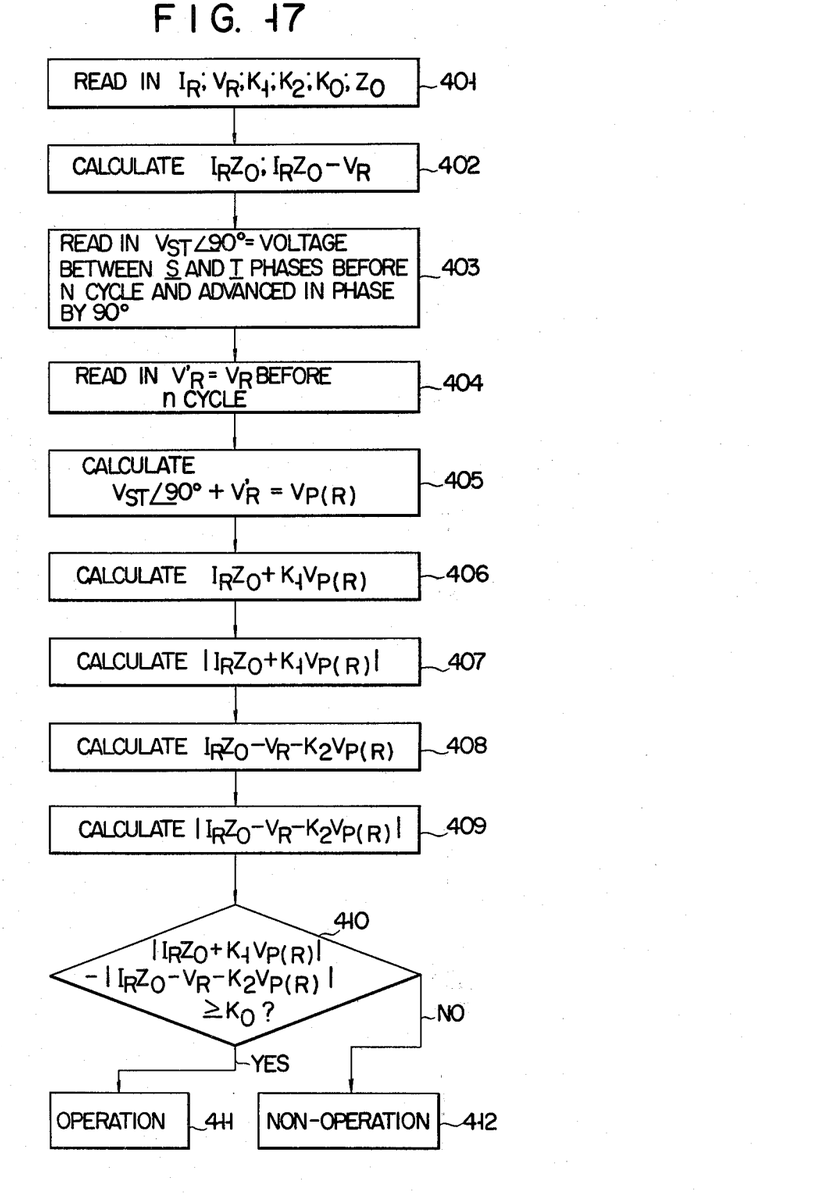
FIG. 17 is a flow chart showing a fourth example of the operation executed by the CPU in the system of FIG. 7.
Figure 18:
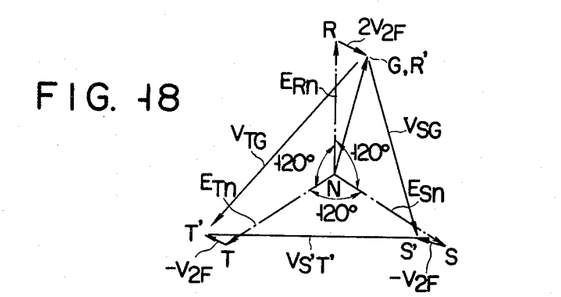
FIG. 18 is a well-known voltage vector deviation diagram at the time of occurrence of a grounding fault in one phase of a three-phase power transmission line.

FIG. 17 shows a flow chart of the operation executed by the CPU 155 on the basis of the relation of formula (17). In this case, a program for executing the operation on the relation of formula (17) is of course stored in the program memory 152. In FIG. 17, in a first step 401 the CPU 155 reads in the current $I_R$ and voltage $V_R$ of R phase from the data memory 151, the constants $K_1$, $K_2$ and $K_0$ from program memory 152 and the setting value $Z_0$ from the setting memory 153. In a second step 402 it calculates the AC quantities $I_R Z_0$ and $I_R Z_0 - V_R$. In a third step 403 it reads in a voltage $V_{ST}\angle 90°$ (i.e., voltage leading the interphase voltage between S and T phases by 90°) before n cycles from the data memory 151. In a fourth step 404 it reads in a voltage $V'_R$ n cycles before R phase voltage $V_R$ from the data memory 151. In a fifth step 405 it calculates the voltage $V_{P(R)}$ n cycles before $(V_{ST}\angle 90° + V'_R)$. In a sixth step 406 it calculates the AC quantity $I_R Z_0 + K_1 V_{P(R)}$. In a seventh step 407 it calculates the amplitude $|I_R Z_0 + K_1 V_{P(R)}|$ of the AC quantity obtained in the sixth step. In an eighth step 408 it calculates the AC quantity $I_R \cdot Z_0 - V_R - K_2 V_{P(R)}$, and in a ninth step 409 it calculates the amplitude $|I_R \cdot Z_0 - V_R - K_2 V_{P(R)}|$ of the AC quantity obtained in the eighth step. In a tenth step 410, it compares the difference between the amplitude $|I_R \cdot Z_0 + K_1 V_{P(R)}|$ obtained in the seventh step and the amplitude $|I_R \cdot Z_0 - V_R - K_2 V_{P(R)}|$ obtained in the ninth step with $K_0$, and produces a command output for taking an action of protecting the power system to the IN/OUT interface 154 if relation of formula (17) is satisfied while producing a command output taking no protective action if the relation of formula is not satisfied. A similar relay system may be constructed in case of introducing the current $I_S$ and voltage $V_S$ of S phase or the current $I_T$ and voltage $V_T$ of T phase. According to this embodiment, even if the voltage for one phase of the power transmission system is reduced to zero level due to occurrence of a grounding accident in that phase, the interphase voltage between the other phases is not changed from its state before the occurrence of the grounding accident, so that there is no possibility of mistaking the direction of the fault point. FIG. 18 shows a known vector diagram of a three phase transmission line deviated when a one line of R phase is grounded. In FIG. 18, a vector $\overrightarrow{RR'}$ ($=2V_{2F}$) is a negative phase voltage, and vectors $\overrightarrow{SS'}$ ($=-2V_{2F}$) and $\overrightarrow{TT'}$ ($=-2V_{2F}$) are positive phase voltages. The potential of R phase is reduced to the earth potential at the time of grounding. As is seen from FIG. 18, the interphase voltage $V_{S'T'}$ between S and T phases after the occurrence of the fault is the same both in phase and magnitude as the voltage $V_{ST}$ before the fault. Broken vectors represent the phase voltages NR, NS and NT before the occurrence of the fault; $E_{Rn}$, $E_{Sn}$ and $E_{Tn}$ represent the phase voltages at the time of the fault; and $V_{TG}$, $V_{SG}$ and $V_{RG}$ represent the line voltages at the time of the fault. FIG. 16 shows the vector relation among the voltages $V_{ST} \angle 90°$, $V_{TR} \angle 90°$ and $V_{TS} \angle 90°$ which are quoted for the explanation of the modification of $V_P$, phase voltages $V_R$, $V_S$ and $V_T$ and line voltages $V_{RS}$, $V_{ST}$ and $V_{TR}$.

As has been described in the foregoing in connection with some preferred embodiments, with the relay system according to the invention the CPU is adapted to determine whether or not the relation of formula (3) or (13) is satisfied, with a voltage $V_P$ in a predetermined relation to the voltage V introduced into that relation, so that even in case when the voltage V is reduced to zero level due to the occurrence of a fault in the power system at a point in the vicinity of the point of installation of the relay system there is no possibility of erroneously determining the direction of the fault point. The constant $K_1$, $K_2$ and $K_0$ in formula (3) or (13) may be appropriately set by taking various conditions of the power system into considerations so that the system may be reliably actuated in response to a fault in the power system without being influenced by the resistance at the fault point or load and also without the possibility of erroneously determining the direction of the fault point. As the voltage $V_P$ may be used a voltage leading in phase by $\psi$ from the voltage V, a voltage n or $(n-\frac{1}{2})$ cycles before the voltage V or an interphase voltage between the other phases than that of the voltage V.

What we claim is:

1. A digital type distance relay system comprising a sampling and hold circuit for sampling and holding the current in and voltage on a power transmission line, an analog-to-digital converter for receiving the outputs of said sampling and hold circuit through a multiplexer and converting the received analog quantities into corresponding digital quantities I and V, and a digital computer for arithmetically processing the outputs of said analog-to-digital converter on the basis of a predetermined arithmetic operation formula and producing a determination output as to whether or not to take an action for protecting said power transmission system in accordance with the result of the arithmetic processing, said digital computer including:

a data memory for memorizing said current I and voltage V and also a digital voltage $V_P$ having a predetermined relation to said voltage V;

a protection range setting memory for memorizing a setting value $Z_0$ for setting a range of protection of said power transmission system by said digital type distance relay system;

a program memory for memorizing constant values $K_1$ and $K_2$, minimum sensitivity value $K_0$ of said distance relay system and a program for executing an arithmetic operation on a formula represented by $$|I \cdot Z_0 + K_1 V_P| - |I \cdot Z_0 - V - K_2 V_P| \geqq K_0;$$

an input/output interface; and a central processor unit coupled to said data memory, protection range setting memory, program memory and input/output interface and serving to execute said program dealing with said arithmetic operation formula and produce an output commanding an action of protecting said power transmission system if said formula is satisfied while producing an output commanding no protective action if said formula is not satisfied.

2. A digital type distance relay system according to claim 1, wherein said voltage $V_P$ is a digital voltage obtained by leading ahead said voltage V in phase by $\psi$.

3. A digital type distance relay system according to claim 1, wherein said voltage $V_P$ is a digital voltage n or $(n-\frac{1}{2})$ cycles (n being a positive integer) before said voltage V.

4. A digital type distance relay system according to claim 3, wherein said central processor unit executes a program including:

a first step of reading out said current I and voltage V from said data memory, said constants $K_1$, $K_2$ and $K_0$ from said program memory and said setting value $Z_0$ from said setting memory;

a second step of calculating the AC quantities $I \cdot Z_0$ and $(I \cdot Z_0 - V)$;

a third step of reading out said voltage $V_P$ n cycles before said voltage V from said data memory;

a fourth step of calculating the AC quantities $K_1 V_P$ and $K_2 V_P$;

a fifth step of calculating the AC quantity $(I \cdot Z_0 + K_1 V_P)$ by adding said AC quantities $I \cdot Z_0$ and $K_1 V_P$;

a sixth step of obtaining the AC quantity amplitude value $|I \cdot Z_0 + K_1 V_P|$ from said AC quantity $(I \cdot Z_0 + K_1 V_P)$;

a seventh step of obtaining the AC quantity $(I \cdot Z_0 - V - K_2 V_P)$ from said AC quantities $(I \cdot Z_0 - V)$ and $K_2 V_P$;

an eighth step of obtaining the AC quantity amplitude value $|I \cdot Z_0 - V - K_2 V_P|$ from said AC quantity $(I \cdot Z_0 + V - K_2 V_P)$; and a ninth step of sending out an output commanding said protective action if said arithmetic operation formula is satisfied while sending out an output commanding no protective action if said formula is not satisfied.

5. A digital type distance relay system according to claim 1, wherein said power transmission system is a three-phase power transmission system, and also wherein said voltage V is a phase voltage of one of the three phases and said voltage $V_P$ is the interphase voltage between the other two phases.

6. A digital type distance relay system according to claim 5, wherein said central processor unit executes a program including:

a first step of reading out current $I_R$ and voltage $V_R$ of one of the three phases of said three-phase power transmission system from said data memory, said constants $K_1$, $K_2$ and $K_0$ from said program memory and said setting value $Z_0$ from said setting memory;

a second step of calculating the AC quantities $I_R Z_0$ and $(I_R Z_0 - V_R)$;

a third step of reading out from said data memory the voltage $V_{ST} \angle 90°$ which is an interphase voltage between S and T phases n cycle before and is made to lead in phase by 90°;

a fourth step of reading out from said data memory the voltage $V'_R$ n cycles before a voltage $V_R$ of R phases;

a fifth step of obtaining a voltage $V_{P(R)}$ by adding the voltage $V_{ST} \angle 90°$ obtained in said third step and the voltage $V'_R$ obtained in said fourth step;

a sixth step of obtaining an AC quantity $(I_R Z_0 + K_1 V_{P(R)})$ by reading out said constant $K_1$ from said program memory and calculating $K_1 V_{P(R)}$;

a seventh step of obtaining the AC quantity amplitude value $|I_R Z_0 + K_1 V_{P(R)}|$ from said AC quantity $(I_R Z_0 + K_1 V_{P(R)})$;

an eighth step of calculating an AC quantity $(I_R Z_0 - V_R - K_2 V_{P(R)})$ from the constant $K_2$ read out from said program memory, the voltage $V_{P(R)}$ obtained in said fifth step and the AC quantity $(I_R Z_0 - V_R)$ obtained in said second step;

a ninth step of obtaining the AC quantity amplitude value $|I_R Z_0 - V_R - K_2 V_{P(R)}|$ from said AC quantity $(I_R Z_0 - V_R - K_2 V_{P(R)})$; and a tenth step of sending out an output commanding said protective action if a relation of formula $|I_R Z_0 + K_1 V_{P(R)}| - |I_R Z_0 - V_R - K_2 V_{P(R)}| \geq K_0$ is satisfied while sending out an output commanding no protective action if said relation is not satisfied.

7. A digital type distance relay system according to claim 1, wherein said central processor unit executes a program including:

a first step of reading out said voltages V and $V_P$ and current I from said data memory, said constants $K_1$, $K_2$ and $K_0$ from said program memory and said setting value $Z_0$ from said setting memory;

a second step of calculating the AC quantities $I \cdot Z_0$ and $(I \cdot Z_0 - V)$;

a third step of calculating the AC quantities $K_1 V_P$ and $K_2 V_P$;

a fourth step of calculating the AC quantity $(I \cdot Z_0 + K_1 V_P)$ by adding said AC quantities $I \cdot Z_0$ and $K_1 V_P$;

a fifth step of obtaining the AC quantity amplitude value $|I \cdot Z_0 + K_1 V_P|$ from said AC quantity $(I \cdot Z_0 + K_1 V_P)$;

a sixth step of obtaining the AC quantity $(I \cdot Z_0 - V - K_2 V_P)$ from said AC quantities $(I \cdot Z_0 - V)$ and $K_2 V_P$;

a seventh step of obtaining the AC quantity amplitude value $|I \cdot Z_0 - V - K_2 V_P|$ from said AC quantity $(I \cdot Z_0 - V - K_2 V_P)$; and an eighth step of sending out an output commanding said protective action if said arithmetic operation formula is satisfied while sending out an output commanding no protective action if said formula is not satisfied.

8. A digital type distance relay system comprising a sampling and hold circuit for sampling and holding the current in and voltage on a power transmission system, an analog-to-digital converter for receiving the outputs of said sampling and hold circuit through a multiplexer and converting the received analog quantities into corresponding digital quantities I and V, and a digital computer for arithmetically processing the outputs of said analog-to-digital converter on the basis of a predetermined arithmetic operation formula and producing a determination output as to whether or not to take an action for protecting said power transmission system in accordance with the result of the arithmetic processing, said digital computer including:

a data memory for memorizing said current I and voltage V and also a digital voltage $V_P$ having a predetermined relation to said voltage V;

a protection range setting memory for memorizing a setting value $Z_0$ for setting a range of protection of said power transmission system by said digital type distance relay system;

a program memory for memorizing constant values $K_1$ and $K_2$, minimum sensitivity value $K_0$ of said distance relay system and a program for executing an arithmetic operation on a formula represented by $|I \cdot Z_0 + K_1 V_P| - |I \cdot Z_0 - K_2 V_P| \geq K_0$;

an input/output interface; and a central processor unit coupled to said data memory, protection range setting memory, program memory and input/output interface and serving to execute said program dealing with said arithmetic operation formula and produce an output commanding an action of protecting said power transmission system if said formula is satisfied while producing an output commanding no protective action if said formula is not satisfied.

9. A digital type distance relay system according to claim 8, wherein said voltage $V_P$ is a digital voltage obtained by leading ahead said voltage V in phase by $\psi$.

10. A digital type distance relay system according to claim 8, wherein said voltage $V_P$ is a digital voltage n or $(n-\frac{1}{2})$ cycles (n being a positive integer) before said voltage V.

11. A digital type distance relay system according to claim 8, wherein said power transmission system is a three-phase power transmission system, and also wherein said voltage V is a phase voltage of one of the three phases and said voltage $V_P$ is the interphase voltage between the other two phases.

12. A digital type distance relay system according to claim 8, wherein said central processor unit executes a program including:
- a first step of reading out said current I from said data memory, said constants $K_1$, $K_2$ and $K_0$ from said program memory and said setting value $Z_0$ from said setting memory;
- a second step of calculating the AC quantity $I \cdot Z_0$;
- a third step of calculating the AC quantities $K_1 V_P$ and $K_2 V_P$;
- a fourth step of calculating the AC quantity $(I \cdot Z_0 + K_1 V_P)$ by adding said AC quantities $I \cdot Z_0$ and $K_1 V_P$;
- a fifth step of obtaining the AC quantity amplitude value $|I \cdot Z_0 + K_1 V_P|$ from said AC quantity $(I \cdot Z_0 + K_1 V_P)$;
- a sixth step of obtaining the AC quantity $(I \cdot Z_0 - K_2 V_P)$ from said AC quantities $I \cdot Z_0$ and $K_2 V_P$;
- a seventh step of obtaining the AC quantity amplitude value $|I \cdot Z_0 - K_2 V_P|$ from said AC quantity $(I \cdot Z_0 - K_2 V_P)$; and
- an eighth step of sending out an output commanding said protective action if said arithmetic operation formula is satisfied while sending out an output commanding no protective action if said formula is not satisfied.

* * * * *